United States Patent
Duong

(10) Patent No.: US 8,973,465 B2
(45) Date of Patent: Mar. 10, 2015

(54) GEARBOX FOR GAS TURBINE ENGINE

(75) Inventor: Hung Duong, Unionville, CT (US)

(73) Assignee: United Technologies Corporation, Hartford, CT (US)

( * ) Notice: Subject to any disclaimer, the term of this patent is extended or adjusted under 35 U.S.C. 154(b) by 608 days.

(21) Appl. No.: 13/554,262

(22) Filed: Jul. 20, 2012

(65) Prior Publication Data

US 2014/0020506 A1    Jan. 23, 2014

(51) Int. Cl.
*F16H 57/02*    (2012.01)
*F16H 1/22*    (2006.01)
*F02C 7/36*    (2006.01)
*F02C 7/32*    (2006.01)

(52) U.S. Cl.
CPC .. *F16H 1/222* (2013.01); *F02C 7/32* (2013.01)
USPC ............ 74/665 F; 74/15.2; 74/665 H; 60/802

(58) Field of Classification Search
USPC ........ 74/15.2, 665 GC, 665 H, 665 F; 60/802
See application file for complete search history.

(56) References Cited

U.S. PATENT DOCUMENTS

| | | | |
|---|---|---|---|
| 2,618,119 A * | 11/1952 | Redding et al. ............ | 60/802 |
| 3,714,779 A | 2/1973 | Stein et al. | |
| 4,287,790 A * | 9/1981 | Fujiwara et al. ......... | 74/665 GB |
| 6,058,791 A | 5/2000 | Brunet | |
| 7,055,330 B2 | 6/2006 | Miller | |
| 7,386,983 B2 | 6/2008 | Miller | |
| 7,500,365 B2 | 3/2009 | Suciu et al. | |
| 8,172,512 B2 | 5/2012 | Short et al. | |
| 8,490,410 B2 * | 7/2013 | Suciu et al. ............ | 60/802 |
| 8,490,411 B2 * | 7/2013 | Suciu et al. ............ | 60/802 |
| 8,764,383 B2 * | 7/2014 | Deperrois et al. ......... | 415/122.1 |
| 2009/0003992 A1 | 1/2009 | Cloft | |
| 2009/0139243 A1 | 6/2009 | Winter | |
| 2009/0223052 A1 | 9/2009 | Chaudhry et al. | |
| 2009/0290976 A1 | 11/2009 | Suciu et al. | |
| 2010/0242496 A1 | 9/2010 | Cass et al. | |
| 2011/0239660 A1 | 10/2011 | Suciu et al. | |
| 2011/0252807 A1 | 10/2011 | Huang et al. | |
| 2011/0289936 A1 | 12/2011 | Suciu et al. | |
| 2012/0117981 A1 | 5/2012 | Suciu et al. | |
| 2013/0180262 A1 * | 7/2013 | Duong ............ | 60/802 |

OTHER PUBLICATIONS

U.S. Appl. No. 13/313,433, "Accessory Gearbox With Tower Shaft Removal Capability," filed on Dec. 7, 2011.
International Search Report and Written Opinion for International Application No. PCT/US2013/046251 completed on Oct. 8, 2013.

* cited by examiner

*Primary Examiner* — William C Joyce
(74) *Attorney, Agent, or Firm* — Carlson, Gaskey & Olds, P.C.

(57) ABSTRACT

A gearbox for a gas turbine engine includes a housing that includes first and second housing portions interconnected by an intermediate housing portion to provide a generally U-shaped structure. Each of the first and second housing portions includes opposing first and second faces. The second faces of the first and second housing portions are adjacent to one another. First and second gear sets are respectively arranged in the first and second housing portions. A third gear set is arranged in the intermediate portion and is coupled to the first and second gear sets. Accessory drive component mounts are provided on at least three of the first and second faces of the first and second housing portions. The mounts are each configured to support an accessory drive component coupled to one of the first and second gear sets.

17 Claims, 4 Drawing Sheets

GEARBOX FOR GAS TURBINE ENGINE

BACKGROUND

This disclosure relates to a gearbox for a gas turbine engine.

A typical gas turbine engine for an aircraft includes an accessory drive gearbox. The gearbox is rotationally coupled to at least one spool of the engine by a tower shaft. In one configuration, the gearbox is mounted adjacent to an engine core and enclosed by a core nacelle surrounding the engine core.

It is desirable to provide a compact gearbox configuration, which more easily packages within the space between the core nacelle and engine core. One example gearbox configuration utilizes an arcuate shaped gearbox assembly with all of the gears within the gearbox parallel to one another. The rotational axes of the gears and the accessory drive components are arranged in the same direction as the axis of the engine core.

SUMMARY

In one exemplary embodiment, a gearbox for a gas turbine engine includes a housing that includes first and second housing portions interconnected by an intermediate housing portion to provide a generally U-shaped structure. Each of the first and second housing portions includes opposing first and second faces. The second faces of the first and second housing portions are adjacent to one another. First and second gear sets are respectively arranged in the first and second housing portions. A third gear set is arranged in the intermediate portion and is coupled to the first and second gear sets. Accessory drive component mounts are provided on at least three of the first and second faces of the first and second housing portions. The mounts are each configured to support an accessory drive component coupled to one of the first and second gear sets.

In a further embodiment of any of the above, the first faces of the first and second housing portions are provided respectively by removable first and second covers.

In a further embodiment of any of the above, a first set of bevel gears interconnects the first and third gear sets. A second set of bevel gears interconnects the second and third gear sets.

In a further embodiment of any of the above, gears of the first, second and third gear sets each include an axis. The gear axes of the first gear set are perpendicular to a first plane. The gear axes of the second gear set are perpendicular to a second plane. The gear axes of the third gear set are perpendicular to a third plane. The first and second planes are non-parallel to one another. The first, second and third planes are transverse to one another.

In a further embodiment of any of the above, accessory drive components are secured to the accessory drive component mounts.

In a further embodiment of any of the above, the intermediate housing portion includes first and second faces opposite one another. An input shaft extends through the first face of the intermediate housing portion and is coupled to the third gear set.

In a further embodiment of any of the above, the second face of the intermediate housing portion includes a tower shaft cover removably secured to the intermediate housing portion over an opening sized to receive the input shaft and an input gear of the third gear set.

In a further embodiment of any of the above, the first and second faces of each of the first and second housing portions are parallel to one another.

In a further embodiment of any of the above, the second faces are about 90° apart. The intermediate housing portion is about 120° apart from each of the first and second housing portions.

In a further embodiment of any of the above, each of the first and second faces of the first and second housing portions includes accessory drive component mounts.

In another exemplary embodiment, a gas turbine engine includes an engine static structure housing a compressor section, a combustor section and a turbine section. A spool supports at least a portion of each of the compressor and turbine sections for rotation about an axis. A gearbox is supported by the engine static structure and is coupled to the spool by a tower shaft. The gearbox includes a housing that includes first and second housing portions interconnected by an intermediate housing portion to provide a generally U-shaped structure. Each of the first and second housing portions includes opposing first and second faces. The second faces of first and second housing portions are adjacent to one another. First and second gear sets are respectively arranged in the first and second housing portions. A third gear set is arranged in the intermediate portion and coupled to the first and second gear sets. An input shaft interconnects the tower shaft to the third gear set. Accessory drive components are mounted on at least three of the first and second faces of the first and second housing portions. Each of the accessory drive components are coupled to one of the first and second gear sets. The accessory drive components are arranged circumferentially about the engine static structure with respect to the axis.

In a further embodiment of any of the above, gears of the first, second and third gear sets each include an axis. The gear axes of the first gear set are perpendicular to a first plane. The gear axes of the second gear set are perpendicular to a second plane. The gear axes of the third gear set are perpendicular to a third plane. The first and second planes are non-parallel to one another. The first, second and third planes are transverse to one another. The gear axes of the first and second gear sets are arranged circumferentially with respect to the axis.

In a further embodiment of any of the above, the first faces of the first and second housing portions are provided respectively by removable first and second covers.

In a further embodiment of any of the above, the intermediate housing portion includes first and second faces opposite one another. The input shaft extends through the first face of the intermediate housing portion and is coupled to the third gear set.

In a further embodiment of any of the above, the second face of the intermediate housing portion includes a tower shaft cover removably secured to the intermediate housing portion over an opening sized to receive the tower shaft.

In a further embodiment of any of the above, the first and second faces of each of the first and second housing portions are parallel to one another.

In a further embodiment of any of the above, the second faces are about 90° apart, and the intermediate housing portion is about 120° apart from each of the first and second housing portions.

BRIEF DESCRIPTION OF THE DRAWINGS

The disclosure can be further understood by reference to the following detailed description when considered in connection with the accompanying drawings wherein.

DETAILED DESCRIPTION

Figure 1:
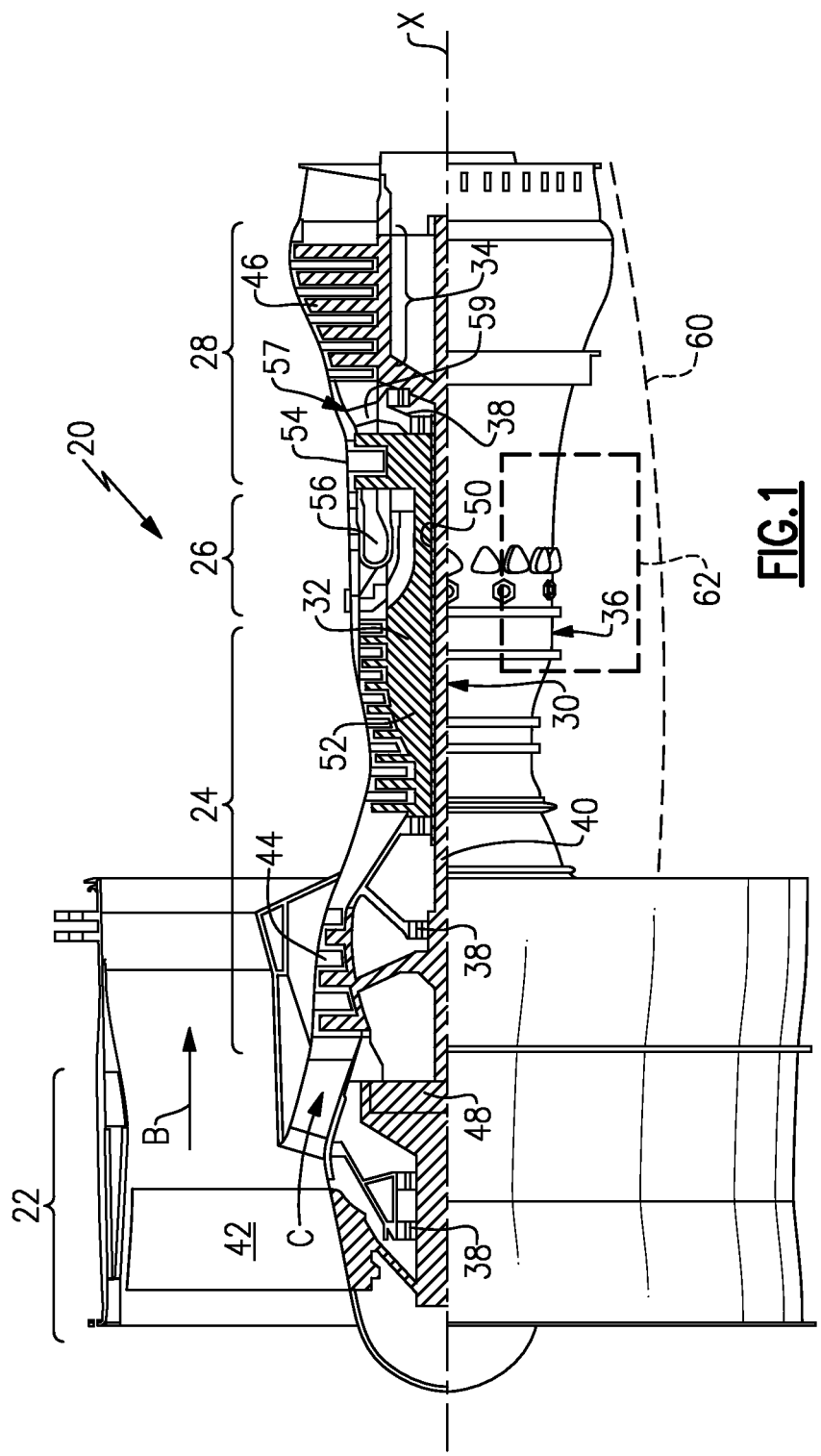
FIG. 1 schematically illustrates a gas turbine engine embodiment.

FIG. 1 schematically illustrates an example gas turbine engine 20 that includes a fan section 22, a compressor section 24, a combustor section 26 and a turbine section 28. Alternative engines might include an augmenter section (not shown) among other systems or features. The fan section 22 drives air along a bypass flow path B while the compressor section 24 draws air in along a core flow path C where air is compressed and communicated to a combustor section 26. In the combustor section 26, air is mixed with fuel and ignited to generate a high pressure exhaust gas stream that expands through the turbine section 28 where energy is extracted and utilized to drive the fan section 22 and the compressor section 24.

Although the disclosed non-limiting embodiment depicts a turbofan gas turbine engine, it should be understood that the concepts described herein are not limited to use with turbofans as the teachings may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example engine 20 generally includes a low speed spool 30 and a high speed spool 32 mounted for rotation about an engine central longitudinal axis X relative to an engine static structure 36 via several bearing systems 38. It should be understood that various bearing systems 38 at various locations may alternatively or additionally be provided.

The low speed spool 30 generally includes an inner shaft 40 that connects a fan 42 and a low pressure (or first) compressor section 44 to a low pressure (or first) turbine section 46. The inner shaft 40 drives the fan 42 through a speed change device, such as a geared architecture 48, to drive the fan 42 at a lower speed than the low speed spool 30. The high-speed spool 32 includes an outer shaft 50 that interconnects a high pressure (or second) compressor section 52 and a high pressure (or second) turbine section 54. The inner shaft 40 and the outer shaft 50 are concentric and rotate via the bearing systems 38 about the engine central longitudinal axis X.

A combustor 56 is arranged between the high pressure compressor 52 and the high pressure turbine 54. In one example, the high pressure turbine 54 includes at least two stages to provide a double stage high pressure turbine 54. In another example, the high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about 5. The pressure ratio of the example low pressure turbine 46 is measured prior to an inlet of the low pressure turbine 46 as related to the pressure measured at the outlet of the low pressure turbine 46 prior to an exhaust nozzle.

A mid-turbine frame 57 of the engine static structure 36 is arranged generally between the high pressure turbine 54 and the low pressure turbine 46. The mid-turbine frame 57 further supports bearing systems 38 in the turbine section 28 as well as setting airflow entering the low pressure turbine 46.

The core airflow C is compressed by the low pressure compressor 44 then by the high pressure compressor 52 mixed with fuel and ignited in the combustor 56 to produce high speed exhaust gases that are then expanded through the high pressure turbine 54 and low pressure turbine 46. The mid-turbine frame 57 includes vanes 59, which are in the core airflow path and function as an inlet guide vane for the low pressure turbine 46. Utilizing the vane 59 of the mid-turbine frame 57 as the inlet guide vane for low pressure turbine 46 decreases the length of the low pressure turbine 46 without increasing the axial length of the mid-turbine frame 57. Reducing or eliminating the number of vanes in the low pressure turbine 46 shortens the axial length of the turbine section 28. Thus, the compactness of the gas turbine engine 20 is increased and a higher power density may be achieved.

The disclosed gas turbine engine 20 in one example is a high-bypass geared aircraft engine. In a further example, the gas turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3.

In one disclosed embodiment, the gas turbine engine 20 includes a bypass ratio greater than about ten (10:1) and the fan diameter is significantly larger than an outer diameter of the low pressure compressor 44. It should be understood, however, that the above parameters are only exemplary of one embodiment of a gas turbine engine including a geared architecture and that the present disclosure is applicable to other gas turbine engines.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ('TSFC')"—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment the low fan pressure ratio is less than about 1.45.

"Low corrected fan tip speed" is the actual fan tip speed in ft/sec divided by an industry standard temperature correction of [(Tram ° R)/518.7) 0.5]. The "Low corrected fan tip speed", as disclosed herein according to one non-limiting embodiment, is less than about 1150 ft/second.

With continuing reference to FIG. 1, an accessory drive gearbox 62 is supported by the engine static structure 36. A core nacelle 60 is arranged about the engine static structure 36 and encloses the gearbox 62.

Figure 2A:
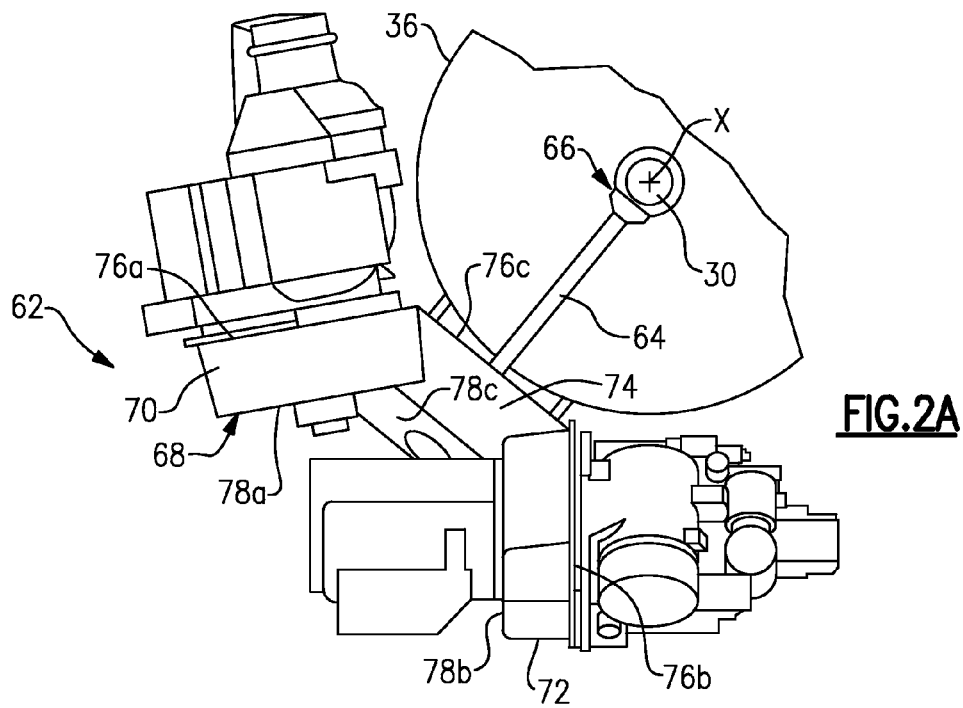
FIG. 2A is an end view of the gearbox operatively coupled to an engine spool, which is shown schematically, including accessory drive components mounted to the gearbox.
Figure 2B:
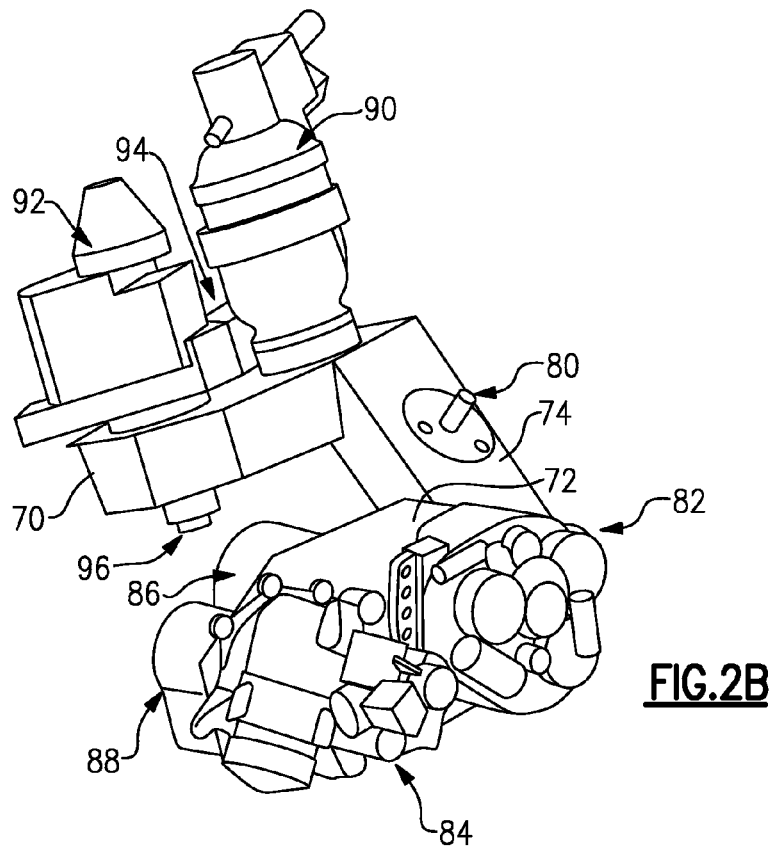
FIG. 2B is a perspective view of the gearbox illustrated in FIG. 2A with accessory drive components.

Referring to FIGS. 2A and 2B, the gearbox 62 is operatively coupled to the low spool 30 by a tower shaft 64. In the example, the tower shaft 64 is rotationally driven by the low spool 30 via a gear set 66, which may be provided by beveled gears. The tower shaft 64 is connected to an input shaft 80 that is supported by the gearbox 62. The input shaft 80 provides the rotational coupling to various accessory drive components 82-96.

The gearbox 62 is provided by a generally U-shaped housing 68 having a first and second housing portions 70, 72 interconnected to one another by an intermediate housing portion 74. The intermediate housing portion 74 supports the input shaft 80. The first housing portion 70 includes first and second spaced apart faces 76A, 78A; the second housing portion 72 includes spaced apart first and second faces 76B, 78B; the intermediate housing portion 74 includes spaced apart first and second faces 76C, 78C. The first faces 76A-C are adjacent to the engine static structure 36.

Instead of mounting the accessory drive components such that their rotational axes are in the same direction as the core engine axis X, the accessory drive components are mounted on both of the first and second faces 76A, 78A and 76B, 78B on the first and second housing portions 70, 72, as necessary, and in the example at least three of the faces. That is, the axes of the accessory drive components are arranged circumferentially relative to the engine static structure 36.

In the example, an integrated drive generator (IDG) 82 and a lubrication pump 84 are mounted to the first face 76B. A hydraulic pump 86 and a back-up variable frequency generator (VFG) 88 are mounted to the second face 78B. An air turbine starter 90, a fuel pump 92 and a permanent magnet alternator (PMA) 94 are mounted to the first face 76A. A deoiler 96 is mounted to a second face 78A. In this manner, the axial length of the gearbox 92 and its arrangement of accessory drive components 82-96 are reduced compared to axially oriented accessory drive components. As a result, the gearbox 62 and accessory drive components 82-96 may be positioned more easily along the length of the engine static structure 36 to more desirable locations where, for example, more space and/or cooler temperatures are provided.

Figure 3A:
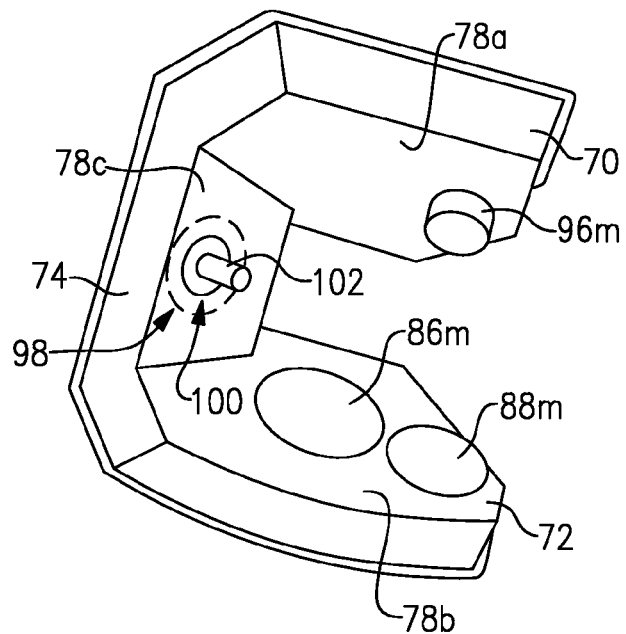
FIG. 3A is a bottom perspective view of the gearbox.
Figure 3B:
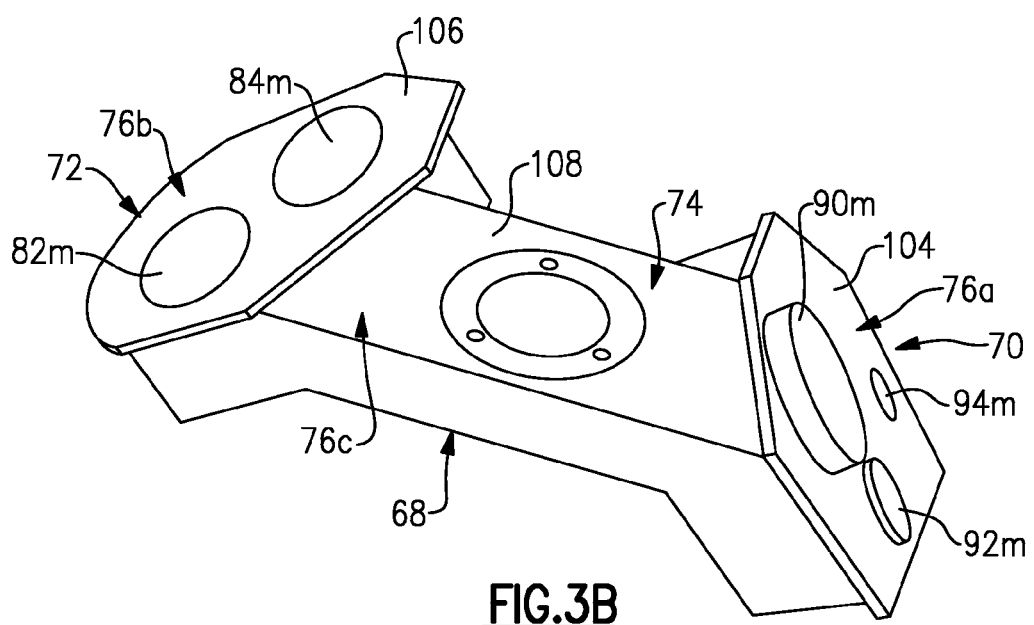
FIG. 3B is a top perspective view of the gearbox.

The mounting locations for the accessory drive components 82-96 are shown in more detail as 82M-96M in FIGS. 3A-3B. Like numerals are used to indicate an association amongst components. The first faces 76A, 76B of the first and second housing portions 70, 72 are provided by removable first and second covers 104, 106 that selectively provide access to an interior of the housing 68 within which the gear train is mounted. An intermediate cover 108 is secured to the intermediate housing portion 74. The first cover 104 provides mounts 90M, 92M, 94M for the ATS 90, the fuel pump 92 and the PMA 94, respectively. The second cover 106 provides mounts 82M, 84M for the IDG 82 and the lubrication pump 84, respectively. The other mounts 86M, 88M and 96M are provided by the second faces 78A, 78B of the first and second housing portions 70, 72 opposite the covers 104, 106.

The covers 104, 106, 108 are removable to provide access to any gear 130, which are mounted to the shafts 126, which are supported by bearings 128 relative to the housing 68. In this manner, the bearings 128 and gears 130 may be easily serviced.

The first, second and intermediate housing portions 70, 72, 74 respectively house first, second and third gear sets 110, 112, 114. The first gear set 110 is operatively connected to the third gear set 114 by a first bevel gear set 116. The second gear set 112 is operatively coupled to the third gear set 114 by the second bevel gear set 118. The input shaft 80 rotationally drives an input gear 120 which rotationally drives the first and second gear sets 110, 112 via first and second idler gears 122, 124. The first gear set 110 includes gears 90G, 92G, 94G, 96G that respectively rotationally drive the ATS 90, the fuel pump 92, the PMA 94 and the deoiler 96. The second gear set 112 includes second gears 82G, 84G, 86G, 88G that respectively drive the IDG 82, the lubrication pump 84, the hydraulic pump 86, and the back-up FVG 88.

Figure 5:
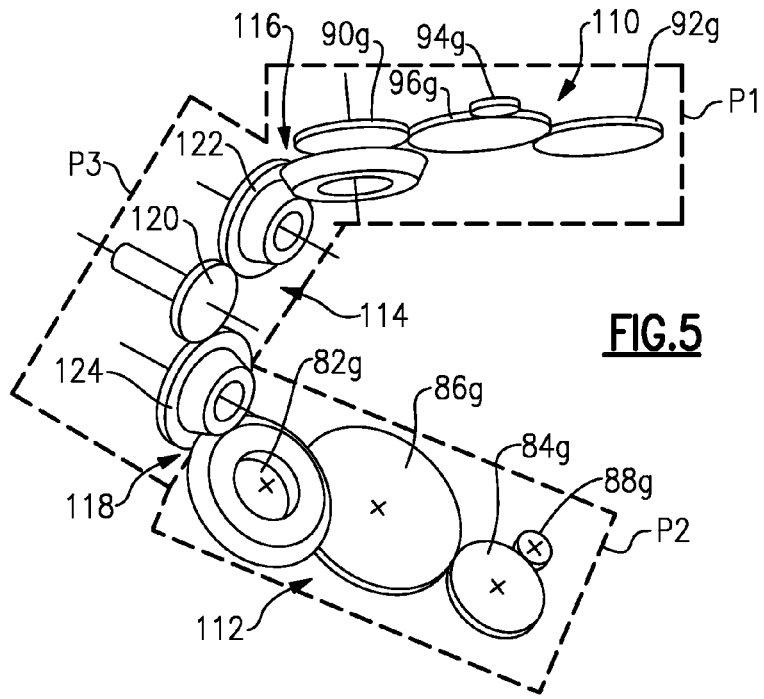
FIG. 5 is a perspective schematic view of the gear sets illustrated in FIG. 4.
Figure 6:
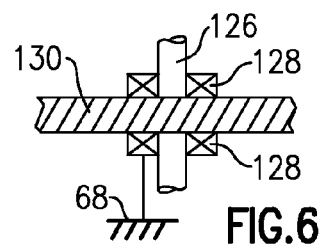
FIG. 6 is a schematic view of an example gear supported by bearings within the gearbox.
Figure 4:
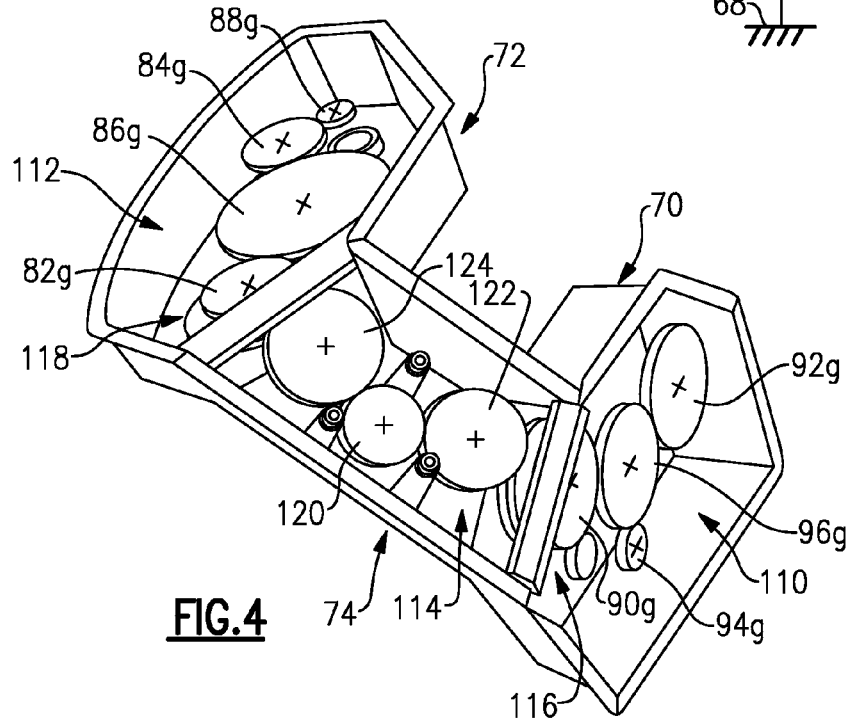
FIG. 4 is a top perspective view of the gearbox with covers removed, illustrating multiple gear sets within the gearbox housing.

It should be understood that fewer or more accessory drive components may be used than those indicated in the example embodiment. Additionally, accessory drive components may not be mounted on all of the first and second faces 76A, 76B, 78A, 78B. As can be appreciated by FIG. 5, the gears of the first gear set 110 are parallel with one another relative to a plane P1. The gears of the second gear set 112 are parallel with one another with respect to a second plane P2. The gears of the third gear set 114 are parallel with one another with respect to a third plane P3. The planes P1-P3 are not parallel relative to one another. Said another way, the gear axes of the first gear set 110 are perpendicular to a first plane P1; the gear axes of the second gear set 112 are perpendicular to a second plane P2; the gear axes of the third gear set 114 are perpendicular to a third plane P3. The first, second and third planes P1-P3 are transverse to one another.

The intermediate housing portion 74 includes a tower shaft cover 98 that may be removed to provide access to an opening 110. The input shaft 80, the input gear 120 and the tower shaft 64 may be removed through the opening 100 to provide access to a bore scope 102. The bore scope 102 may be inserted into the space previously occupied by the tower shaft 64 to inspect the engine.

Although an example embodiment has been disclosed, a worker of ordinary skill in this art would recognize that certain modifications would come within the scope of the claims. For that reason, the following claims should be studied to determine their true scope and content.

What is claimed is:

1. A gearbox for a gas turbine engine comprising:
a housing including first and second housing portions interconnected by an intermediate housing portion to provide a generally U-shaped structure, each of the first and second housing portions including opposing first and second faces, the second faces of first and second housing portions adjacent to one another;
first and second gear sets respectively arranged in the first and second housing portions, and a third gear set arranged in the intermediate portion and coupled to the first and second gear sets; and
accessory drive component mounts provided on at least three of the first and second faces of the first and second housing portions, the mounts each configured to support an accessory drive component coupled to one of the first and second gear sets.

2. The gearbox according to claim 1, wherein the first faces of the first and second housing portions are provided respectively by removable first and second covers.

3. The gearbox according to claim 1, wherein a first set of bevel gears interconnects the first and third gear sets, and a second set of bevel gears interconnects the second and third gear sets.

4. The gearbox according to claim 1, wherein gears of the first, second and third gear sets each include an axis, the gear axes of the first gear set perpendicular to a first plane, the gear axes of the second gear set perpendicular to a second plane, the gear axes of the third gear set perpendicular to a third plane, the first and second planes non-parallel to one another, and the first, second and third planes transverse to one another.

5. The gearbox according to claim 1, wherein accessory drive components are secured to the accessory drive component mounts.

6. The gearbox according to claim 1, wherein the intermediate housing portion includes first and second faces opposite one another, and an input shaft extends through the first face of the intermediate housing portion and is coupled to the third gear set.

7. The gearbox according to claim 6, wherein the second face of the intermediate housing portion includes a tower shaft cover removably secured to the intermediate housing portion over an opening sized to receive the input shaft and an input gear of the third gear set.

8. The gearbox according to claim 1, wherein the first and second faces of each of the first and second housing portions are parallel to one another.

9. The gearbox according to claim 8, wherein the second faces are about 90° apart, and the intermediate housing portion is about 120° apart from each of the first and second housing portions.

10. The gearbox according to claim 1, wherein each of the first and second faces of the first and second housing portions includes accessory drive component mounts.

11. A gas turbine engine comprising:
engine static structure housing a compressor section, a combustor section and a turbine section;
a spool supporting at least a portion of each of the compressor and turbine sections for rotation about an axis;
a gearbox supported by the engine static structure and coupled to the spool by a tower shaft, the gearbox comprising:
a housing including first and second housing portions interconnected by an intermediate housing portion to provide a generally U-shaped structure, each of the first and second housing portions including opposing first and second faces, the second faces of first and second housing portions adjacent to one another;
first and second gear sets respectively arranged in the first and second housing portions, and a third gear set arranged in the intermediate portion and coupled to the first and second gear sets;
an input shaft interconnecting the tower shaft to the third gear set; and
accessory drive components mounted on at least three of the first and second faces of the first and second housing portions, each of the accessory drive components coupled to one of the first and second gear sets, the accessory drive components arranged circumferentially about the engine static structure with respect to the axis.

12. The gas turbine engine according to claim 11, wherein gears of the first, second and third gear sets each include an axis, the gear axes of the first gear set perpendicular to a first plane, the gear axes of the second gear set perpendicular to a second plane, the gear axes of the third gear set perpendicular to a third plane, the first and second planes non-parallel to one another, and the first, second and third planes transverse to one another, the gear axes of the first and second gear sets arranged circumferentially with respect to the axis.

13. The gas turbine engine according to claim 12, wherein the first faces of the first and second housing portions are provided respectively by removable first and second covers.

14. The gas turbine engine according to claim 12, wherein the intermediate housing portion includes first and second faces opposite one another, and the input shaft extends through the first face of the intermediate housing portion and is coupled to the third gear set.

15. The gas turbine engine according to claim 14, wherein the second face of the intermediate housing portion includes a tower shaft cover removably secured to the intermediate housing portion over an opening sized to receive the tower shaft.

16. The gas turbine engine according to claim 11, wherein the first and second faces of each of the first and second housing portions are parallel to one another.

17. The gas turbine engine according to claim 16, wherein the second faces are about 90° apart, and the intermediate housing portion is about 120° apart from each of the first and second housing portions.

* * * * *